United States Patent

Hansen et al.

[11] Patent Number: 5,245,780
[45] Date of Patent: Sep. 21, 1993

[54] AUTOMATIC OUTRIGGER CONTROL

[76] Inventors: Norman B. Hansen, 4215 S. Ocean Blvd., #7, Highland Beach, Fla. 33487; Andre Villenueve, 5350 NE. 17th Terr., Ft. Lauderdale, Fla. 33334

[21] Appl. No.: 780,465

[22] Filed: Oct. 22, 1991

[51] Int. Cl.$^5$ .................... A01K 97/00; A01K 73/00; F16M 13/00
[52] U.S. Cl. .................................. 43/27.4; 43/21.2; 43/8; 248/654; 248/515
[58] Field of Search .............. 43/21.2, 8, 27.4; 248/653, 654, 514, 515, 168

[56] References Cited

U.S. PATENT DOCUMENTS

| | | | |
|---|---|---|---|
| 2,997,188 | 8/1961 | Hauser | 43/8 |
| 3,493,200 | 2/1970 | Huffman | 248/654 |
| 3,662,484 | 5/1972 | Dres | 43/8 |
| 4,125,955 | 11/1978 | Puretic | 43/8 |
| 4,215,839 | 8/1980 | Gibran | 248/170 |
| 4,384,542 | 5/1983 | Wilson | 43/27.4 |
| 4,813,171 | 3/1989 | Cooper et al. | 43/21.2 |

Primary Examiner—Mark Rosenbaum
Assistant Examiner—Jeanne M. Elpel
Attorney, Agent, or Firm—Malin, Haley, DiMaggio & Crosby

[57] ABSTRACT

An outrigger device is provided for automatically controlling outriggers on a fishing boat. The device comprises three strut members connected to a side surface on a fishing boat at given points. Two of the strut members will be of variable length, while the third strut member is of a fixed length. The first variable strut member serves as a base for the main outrigger pole. The second variable strut member and the fixed strut member serve as supporting and controlling struts for the outrigger pole. Variable strut members will be varied, either independently or together, to change the position of the outrigger device to correspond to several different situations.

15 Claims, 8 Drawing Sheets

AUTOMATIC OUTRIGGER CONTROL

BACKGROUND OF THE INVENTION

1. Field of the Invention

The present invention relates to fishing outriggers and more particularly to a remote controlled outrigger apparatus for power driven deployment, retrieval and lowering of outrigger poles on a fishing boat.

2. Description of the Prior Art

Various fishing outriggers have become well known in the field of fishing. U.S. Pat. No. 4,813,171 to Cooper et al teaches a lateral fishing outrigger having a mast with one end pivotally attached to the side of a boat at a given point and at least one collar disposed in the vicinity of the other end of the mast for guiding fishing lines. A power operated actuator for the outrigger includes a housing pivotally attached to the side of the boat, a drive disposed in the housing, and a rod connected to the drive and pivotally attached to the other end of the mast for pivoting the mast toward and away from the side of the boat about the given point.

U.S. Pat. No. 4,384,542 to Wilson teaches of an outrigger device attachable to a flying bridge or a tower leg, comprising a hollow tubular member which is connected to the flying bridge or tower support member. The hollow tubular member has its proximal end connected to a system of brackets which allows pivotal movement of the tubular member about multiple axes. The system of brackets is connected to the flying bridge or tower support member, and includes a collapsible brace member connected between the support member and the tubular member. The system of brackets also includes a singular brace member connected between the flying bridge beneath the support member and the tubular member. When not in use, the outrigger device is folded compactly against the flying bridge or tower leg adjacent the support member and held in place by a spring locking clamp.

U.S. Pat. No. 2,727,707 to Wells discloses a fishing rod outrigger holder which is adapted to be mounted upon a flat vertical surface to swing backwardly against the vertical surface. The outrigger includes a lower bracket and a socket connected at its lower end to the lower bracket to be movable about horizontal and vertical axes. The outrigger holder also includes an upper bracket spaced from the lower bracket and an arcuate member unsupported at its lower end and with its upper end pivotally connected to the upper bracket to be movable in a horizontal arc extending rearwardly of the upper bracket. Clamping means is provided for connecting the socket at a desired point on the arcuate member and a movable latch is provided at the upper end of the arcuate member to selectively engage the upper bracket and lock the pivotal connection and arcuate member substantially at a right angle to the surface.

U.S. Pat. No. 4,388,774 to Thoemke discloses a fishing system for a recreational, commercial or pleasure type boat which includes an inner pair of fishing poles mounted near the gunwales of the boat to position inner fishing lines closely adjacent the sides of the boat. A rearwardly extending pair of fishing poles are carried by holders mounted on the stern of the boat to position rearward lines laterally inwardly of inner fishing lines. An outer pair of fishing poles are mounted on the outward end portions of elongate booms to position outer lines at a location a relatively large distance laterally outwardly from the inner fishing lines. The booms are disposed transversely to the length of the boat and are supported by antifriction support assemblies which support the booms for extensional travel outwardly from one side of the boat and for retractional travel towards the opposite side of the boat.

The prior art fails to teach of an automatically controlled outrigger device that can be easily operated by the 13 pressing of a button. With the prior art devices, the operator of the outrigger is required to halt whatever he or she is doing and attend to the outrigger. Additionally, most prior art devices require manual operation of the outriggers. This can cause problems when the operator is the only person onboard the boat and must also steer or drive the boat. This is even of more importance when the boat is in heavy traffic with other boats or is going under a bridge and the operator of the vessel is the only person onboard the boat. In the two latter situations, the operator often does not have time to stop the boat in the open water, tend to the outriggers and then resume operation of the boat. The prior art fails to teach of a device which can allow the operator of the boat to continue to drive the boat and simultaneously place the outriggers to their respective desired positions. It was with these problems in mind that the present invention was designed.

SUMMARY OF THE INVENTION

The present invention teaches of a mechanism consisting of three strut members, two of variable length, which are controlled by mechanical/electromechanical actuators, and a third of fixed length. The first variable strut member and the fixed strut member are pivotally fastened to a side bulkhead on the boat by first and second universal joints, and to each other by third and fourth universal joints pivotally fastened to the second variable strut member. The second variable strut member is pivotally fastened to the bulkhead by a fifth universal joint foreword of the first and second universal joints.

In an installation as an outrigger support/controller, the second variable strut member will serve as a base for the main outrigger pole. The working length of first and second variable strut members may be varied by making them telescoping mechanisms. Alternatively, the effective length of the second variable strut member may be made variable by mounting third and fourth universal joints to a slide car which moves a long a track fixed to the second variable strut member. The second variable strut member may then extend beyond the third and fourth universal joints to become the outrigger pole (or the outrigger pole may be inserted into the top of second variable strut member). Any supporting wires may be fastened at a point above the attachment points of third and fourth universal joints at their position of greatest extension.

The first variable strut member and the fixed strut member serve as supporting and controlling struts for the outrigger pole. The specific lengths of the strut members and the locations of the universal joints may be varied to a large degree to accommodate the size of boat and outrigger poles, stroke length of the actuators used, range of motion desired, and mounting locations available.

Though the system may be manipulated through an infinite number of positions, three are of particular interest. The first position is when the boat is cruising to its destination. In this position, first and second variable strut members are in their retracted, or shortest, position. The outrigger pole will be held erect and close to the sides of the boat. This is the most common position for the device when not trolling.

The second position is used when the boat is troll fishing. In this position, second variable strut member will be at its shortest position and first variable strut member will be at its longest position. Accordingly, the outrigger pole will be held far out to the side of the boat, where it is desired for trolling purposes.

The third position is used when the boat is passing under a bridge or is being stored in a covered slip which provide only limited vertical clearance. In this position, first variable strut member will be in its shortest position, while second variable strut member will be in its longest position. This position holds the outrigger pole close to the side of the boat, and lowers the angle so that its height above the deck of the boat is reduced to nearly half that required in the cruising position.

In accordance with these and other objects which will become apparent hereinafter, the instant invention will now be described with particular reference to the accompanying drawings.

DETAILED DESCRIPTION OF THE PREFERRED EMBODIMENT

Figure 1:
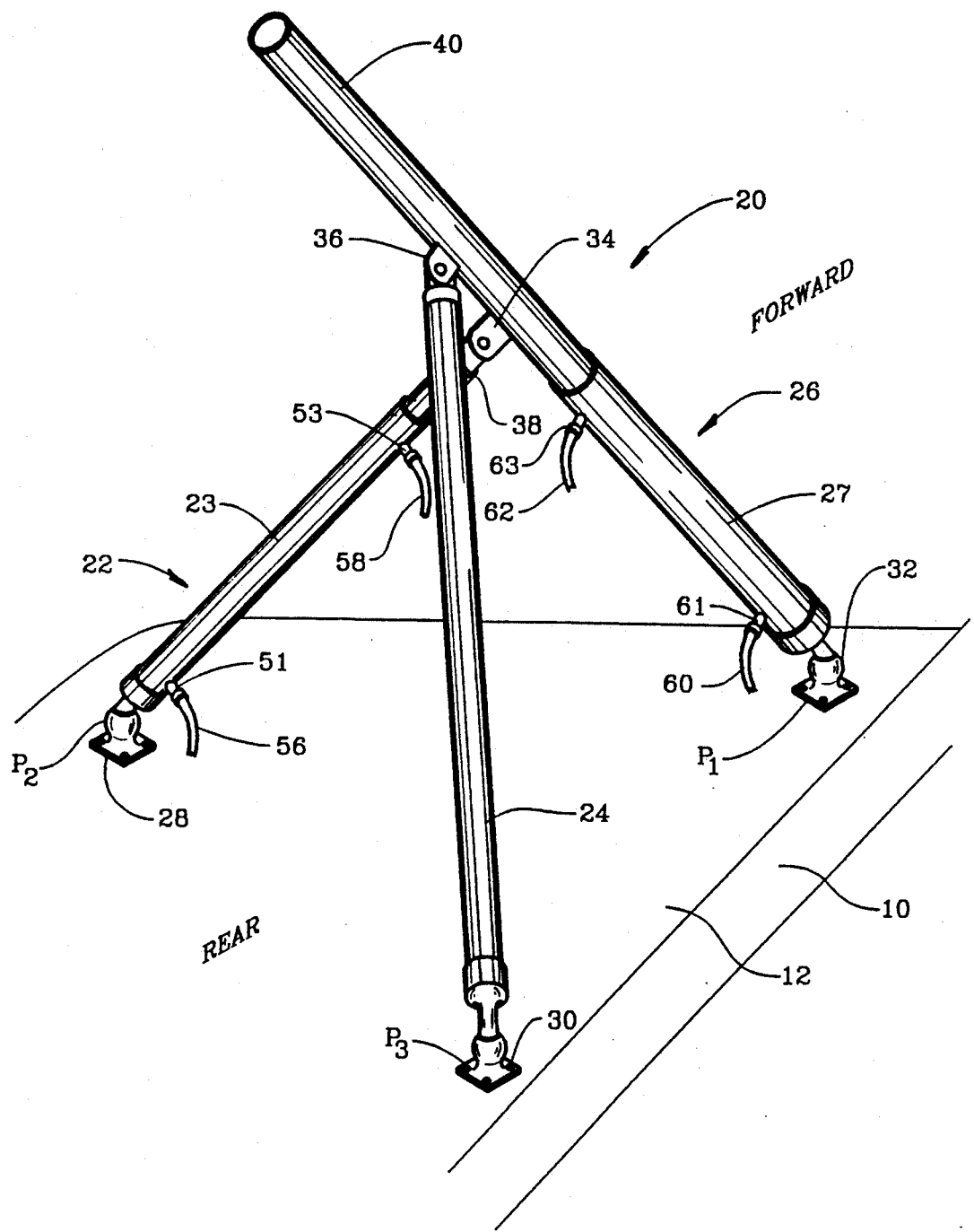
FIG. 1 is a perspective view of the present invention in a first position.
Figure 2:
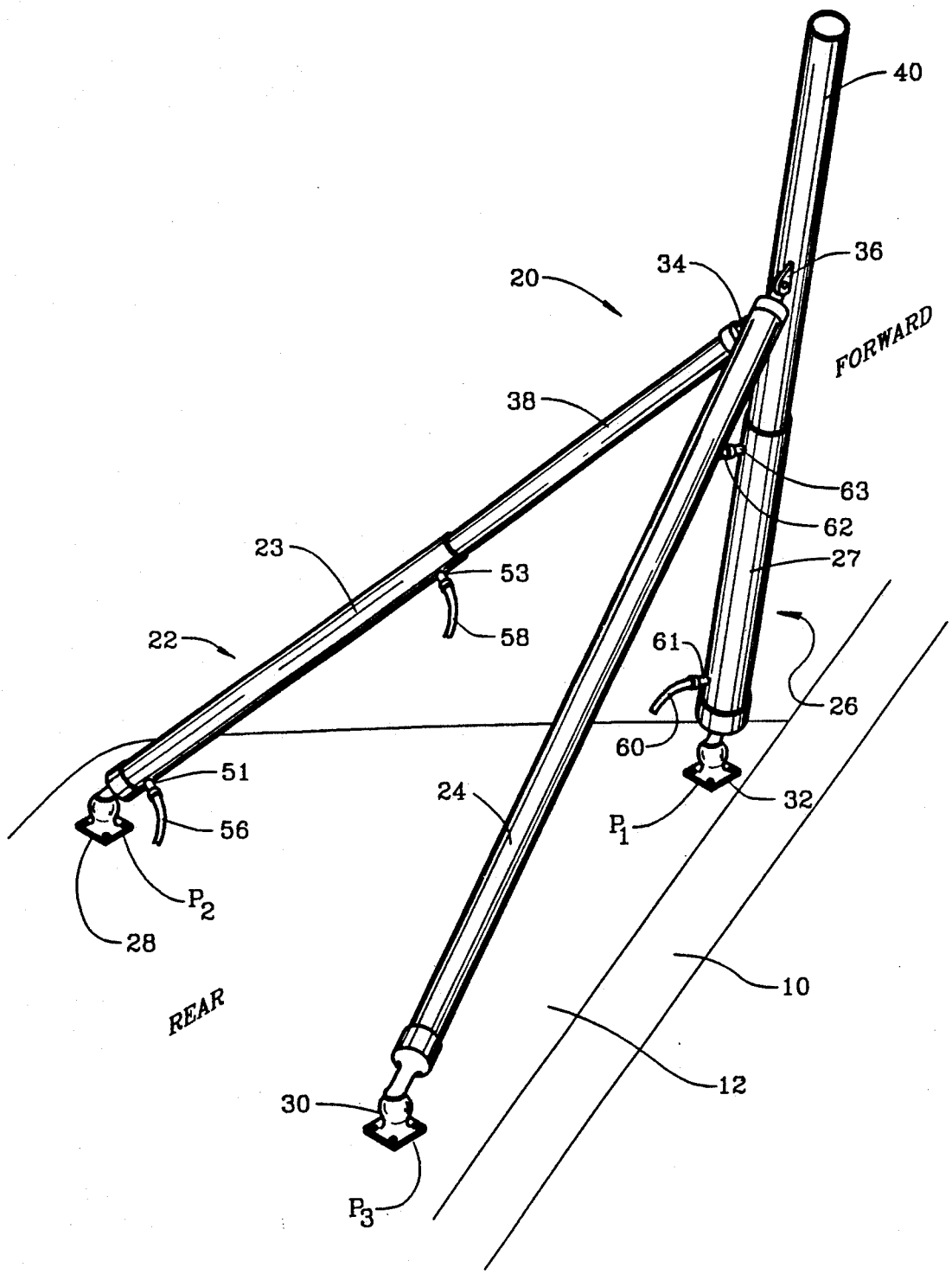
FIG. 2 is a perspective view of the present invention connected to marine vessel and placed in a second position.
Figure 3:
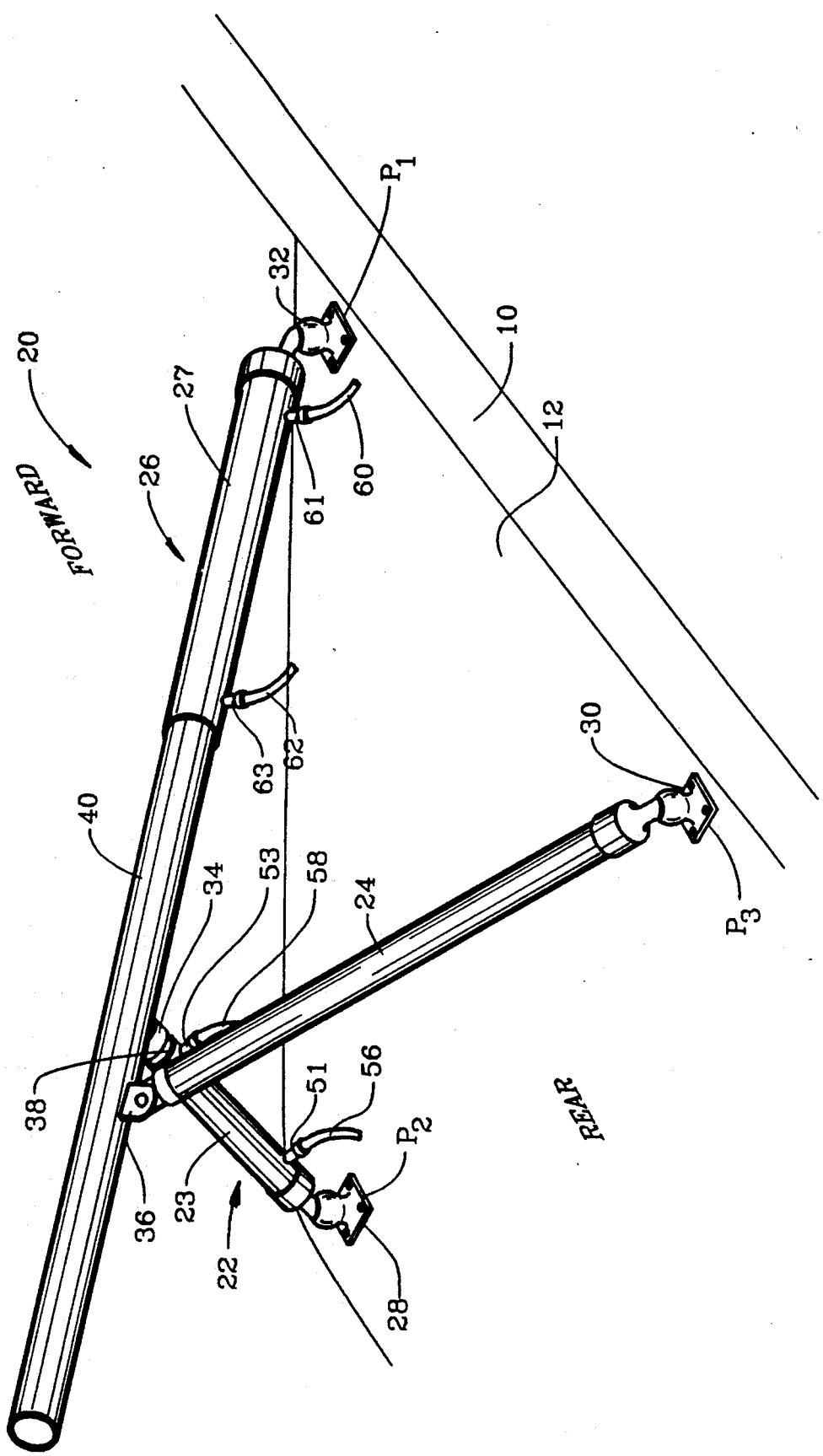
FIG. 3 is a perspective view of the present invention in a third position.

As seen in FIGS. 1, 2 and 3, automatic outrigger device 20 comprises variable length strut members 22 and 26 and fixed length strut member 24. Members 22, 24 and 26 are each pivotally attached at one end to boat surface 12 of boat 10. Though the figures show device 20 on one side of boat 10, it is to be understood that the outrigger device 20, as well as prior art outrigger devices, are preferably located on both sides of boat 10. As seen in the figures, member 26 is attached at a given point $P_1$ on boat surface 12 forward of members 22 and 24. Additionally, members 24 and 26 are attached at given points $P_3$, $P_1$, respectively on boat surface 12 at a position vertically lower than member 22. Preferably, members 22, 24 and 26 are pivotally attached to boat surface 12 by universal joints 28, 30, and 32, respectively. However, any attachment means which will allow respective members 22, 24 and 26 to pivot relative to their attachment point is within the scope of the present invention.

Preferably, variable length members 22 and 26 will incorporate fluid actuated ram devices, such as hydraulic rams within cylinders 23 and 27, cooperating with telescoping rams or pistons 38 and 40, respectively. Cylinder 23 will have a first end 51 and a second end 53. Cylinder 27 will have a first end 61 and a second end 63. Fixed length member 24 is preferably a strut member which provides tripodal support to device 20. Strut member 24 is pivotally attached by universal joint 36 at its second end to telescoping piston rod 40. Telescoping piston rod 38 of cylinder 23 is pivotally attached to telescoping piston rod 40 of cylinder 27 by universal joint 34 intermediate universal joints 36 and 32.

A conventional outrigger pole can be attached at the exposed end of piston rod 40 or, alternatively, a fishing line guide, such as a collar 41 can be disposed near the exposed end of piston rod 40.

Figure 4:
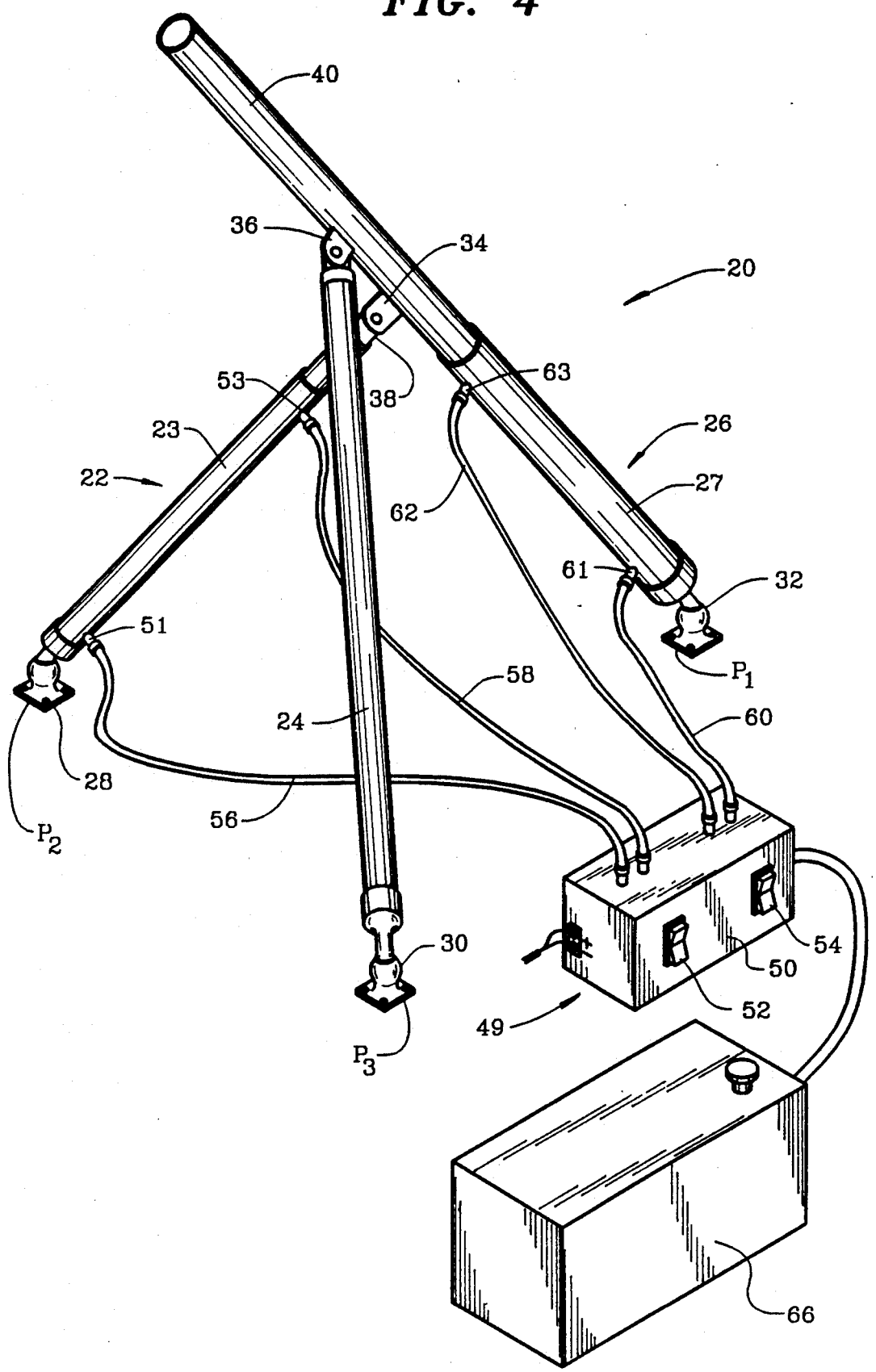
FIG. 4 is a perspective view of the hydraulic fluid pressure assembly used in conjunction with the present invention.

The hydraulic fluid pressure assembly 49 is shown in FIG. 4. Assembly 49 generally includes pump or pressure tank 66 cooperating with a valve assembly or manifold 50 to provide hydraulic fluid under pressure to cylinders 23 and 27. Assembly 49 can have its own power supply (not shown) or preferably can be supplied power by a standard boat battery (not shown). A first pair of hoses 56 and 58 are connected at their respective first ends to valve assembly 50. Hose 56 is attached at its second end to cylinder 23 at end 51. Hose 56 provides fluid communication between valve assembly 50 and cylinder 23.

Whenever piston 38 is required to be extended outward, hydraulic fluid under pressure is provided through hose 56 from hydraulic fluid pressure assembly 49, as by pressing actuator 52 of valve assembly 50. Preferably, actuator 52 can be an electrical switch on the bridge of the boat. Actuator 52 can communicate with a solenoid actuated valve (not shown) of valve assembly 50 for providing hydraulic fluid under pressure to cylinder 23. This position is desirable when trolling as will be described below. Hose 58 is attached to cylinder 23 at end 53 of cylinder 23. Hose 56 is positioned at this point since cylinder 23 is pivotally attached to boat surface 12 in a downward direction. Therefore, fluid will be maintained within cylinder 23 by the non-exposed end of piston rod 38 when piston rod 38 is extended. Like hose 56, hose 58 provides fluid communication between valve assembly 50 and cylinder 23. However, hose 58 is used to retract piston rod 38 back within hollow cylinder 23. Valve assembly 50 comprises a pair of four way directional valves (not shown). The first four way directional valve functions to provide a supply of pressurized fluid to hose 56 and ultimately to cylinder 23 and also returns the hydraulic fluid through hose 58 from cylinder 23. Hoses 56 and 58 provide fluid communication between manifold or valve assembly 50 and the interior or chamber of cylinder 23 to provide or return pressurized fluid, to or from the interior of cylinder 23, in order to extend or retract telescoping piston 38 of cylinder 23.

A second pair of hoses 60 and 62 are connected at their respective first ends to valve assembly 50, the second end of hose 60 is connected to end 61 of cylinder 27, while the second end of hose 62 is connected to end 63 of cylinder 27. Hoses 60 and 62 are used similarly to hoses 56 and 58 by pushing actuator 54 of valve assembly 50, when it is desired to extend or retract piston rod 40. Whenever piston 40 is to be extended outward, hydraulic fluid under pressure is provided through hose 60 from hydraulic fluid pressure assembly 49, as by pressing actuator 54 of valve assembly or manifold 50. Preferably, actuator 54 can be an electrical switch on the bridge of the boat. Actuator 54 can communicate with a solenoid actuated valve (not shown), located near the engine of the boat, for providing fluid to cylinder 27. The second four way directional valve functions to provide a supply of pressurized fluid to hose 60 and ultimately to cylinder 27 and also returns the hydraulic fluid through hose 62 from cylinder 27. Hoses 60 and 62 provide fluid communication between manifold or valve assembly 50 and the interior or chamber of cylinder 27 to provide or return pressurized fluid, to or from the interior of cylinder 27, in order to extend or retract telescoping piston 40 of cylinder 27.

Preferably, actuators 52 and 54 are within reach of the operator of boat 10 for convenience, and can be located on the boat dashboard (not shown). The remaining parts of hydraulic fluid pressure assembly 49 may be located out of the way and sight of boat passengers. By being located within the reach of the driver, the operator can simultaneously, automatically, change the position of the outriggers and drive the boat. Additionally, it is preferable to have actuator 52 operate on outrigger device 20 on each side of the boat simultaneously if desired. This will ensure that variable member 22 on each side of the boat extends the outrigger the same distance each time. Likewise, it is also desirable to have actuator 54 operate on device 20 each side of the boat simultaneously. However, each side outrigger can be independently controlled by providing an additional valve assembly or manifold 50.

Variable member 22 and fixed member 24 are adapted to swing about an axis drawn through universal joints 28 and 30, as controlled by the length of variable member 26. Fixed member 24 and variable member 26 are able to swing about an axis drawn through universal joints 30 and 32, as controlled by the length of variable member 22. Variable member 26 will translate device 20 along a first plane, while variable member 22 will translate device 20 a linear distance along a second plane which is perpendicular to the first plane.

Device 20 may be manipulated through an infinite number of positions, by varying the lengths of members 22 and 26 either together or independently. Such variation of the lengths of members 22 and 26 is accomplished by the extension or retraction of piston rods 38 and 40, and the corresponding pistons (not shown), of cylinders 23 and 27, respectively. However, three of such positions are of particular interest. The first position of outrigger device 20 is shown in FIG. 1 and is desirable when boat 10 is cruising or moving to its desired location. In this position, variable length members 22 and 26 are at their shortest respective lengths. Specifically, in this position, no hydraulic force is applied to cylinders 23 and 27. Therefore, the telescoping piston rods 38 and 40 are retracted within cylinders 23 and 27, respectively.

The second position is shown in FIG. 2 and is desirable when boat 10 is being used for trolling. In this position, member 22 is at its greatest length, while member 26 remains retracted at its shortest length. Member 22 reaches this length by supplying hydraulic fluid to cylinder 23 which in turn extends telescoping piston rod 38. In this position, sufficient hydraulic force is supplied to cylinder 22 to fully extend telescoping piston rod 38. This causes member 26 to pivot away from boat 10 relative to its attachment with boat surface 12 by universal joint 32. In this position, maximum distances between the fishing lines (not shown) will be achieved in order to avoid entanglement of the lines, as well as to provide a maximum fishing range. In addition, device 20 will keep the fisherman's line, when he has no fish on the line, far enough from the side of the boat that the line does not trail in the wake of the boat.

The third position is shown in FIG. 3 and is desirable when boat 10 is passing under a bridge (not shown), is being stored in a boat marina, or is being stored in a covered slip which may be prohibited by the height of member 26 when in the cruising position. In this position, member 26 is at its greatest length, while member 22 is at its shortest length. In other words, sufficient fluid is supplied to cylinder 27 to fully extend telescoping piston rod 40. In this position, member 26 will be held close to the side of boat 10, while lowering member 26 so its height above the deck of boat 10 is reduced to approximately half of the height it assumes when in the cruising or first position. As seen in FIG. 3, by extending piston rod 40 of cylinder 27, members 22 and 24 pivot around their respective attachment points $P_2$ and $P_3$ at 28 and 30, on boat surface 12. This pivoting of members 22 and 24 lowers member 26 to its desired position due to the attachment of members 22 and 24 to piston rod 40 of cylinder 27.

Figure 5:
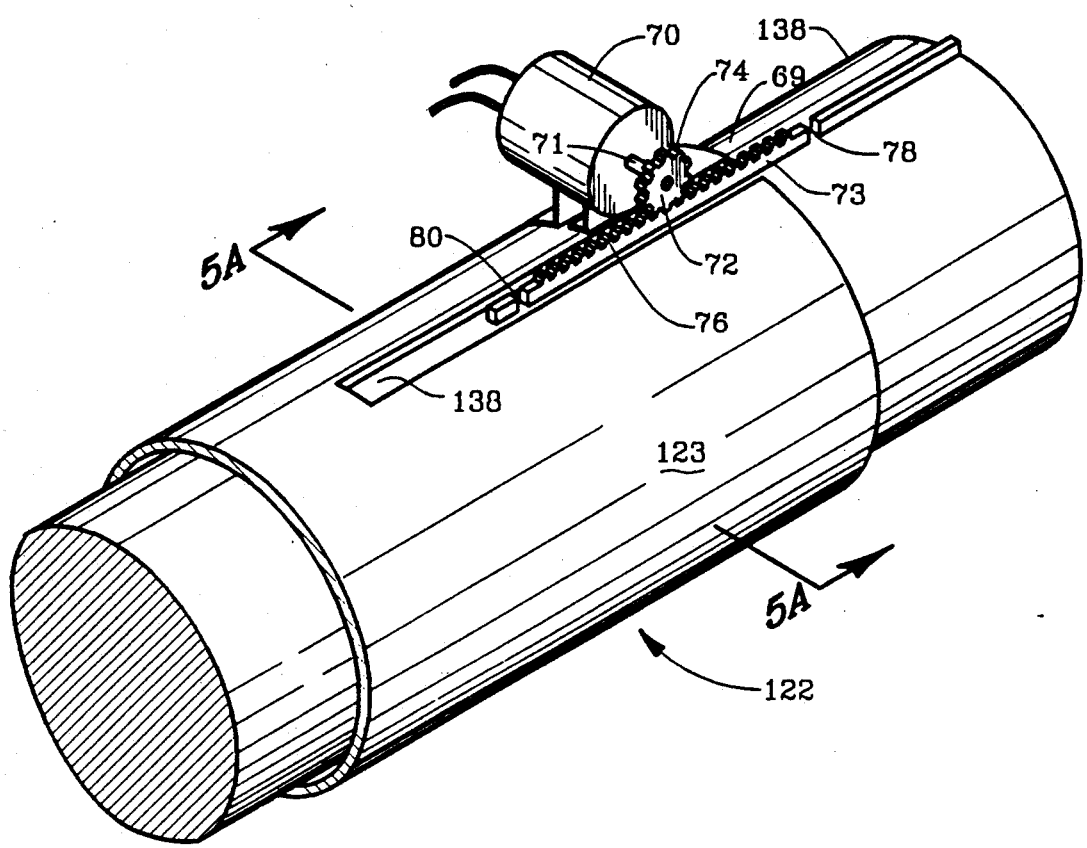
FIG. 5 is a top view of a second embodiment of the actuator of the present invention.
Figure 5A:
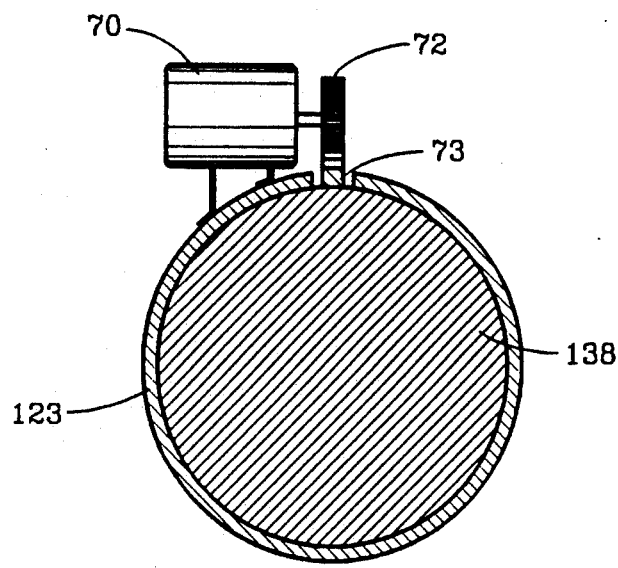
FIG. 5A is a sectional view of the second embodiment of the actuator of the present invention taken along line 5A—5A of FIG. 5.

In an alternative embodiment, cylinders 23 and 27 and telescoping pistons 38 and 40, as well as hydraulic fluid pressure assembly 49, are replaced by a rack and pinion assembly 69 cooperating with a motor 70. Motor 70 is connected to a power source on the boat 10 (not shown) and will be connected to a female telescoping member 23. As seen in FIG. 5, variable member 22 is shown as a rack 73 having teeth 76. The length of variable member 122 will be longer than shown as indicated by break points 78 and 80. Variable member 122 will be pivotally attached to boat surface 12 by a universal joint (not shown) as described above. A gear 72 having teeth 74 is connected by shaft 71 to motor 70. Motor 70 will be able to turn gear 72 both clockwise and counterclockwise. Motor 70 will be supplied power by a power source (not shown) as described for hydraulic fluid pressure assembly 49. Teeth 74 and 76 cooperate with each other, when motor 70 is energized, to either extend or retract variable member 122. By energizing motor 70, gear 72, which is perpendicular to rack 73, will turn in one direction to translate rack 73 with respect to female telescoping member 123 to in turn extend variable member 122 or turn in the opposite direction to translate rack 73 in the opposite direction with respect to female telescoping member 123 to retract variable member 122. It is to be understood that this embodiment will also work in the same manner for variable member 126. Fixed strut member 124 does not change and will function in the same manner as described earlier.

Figure 6:
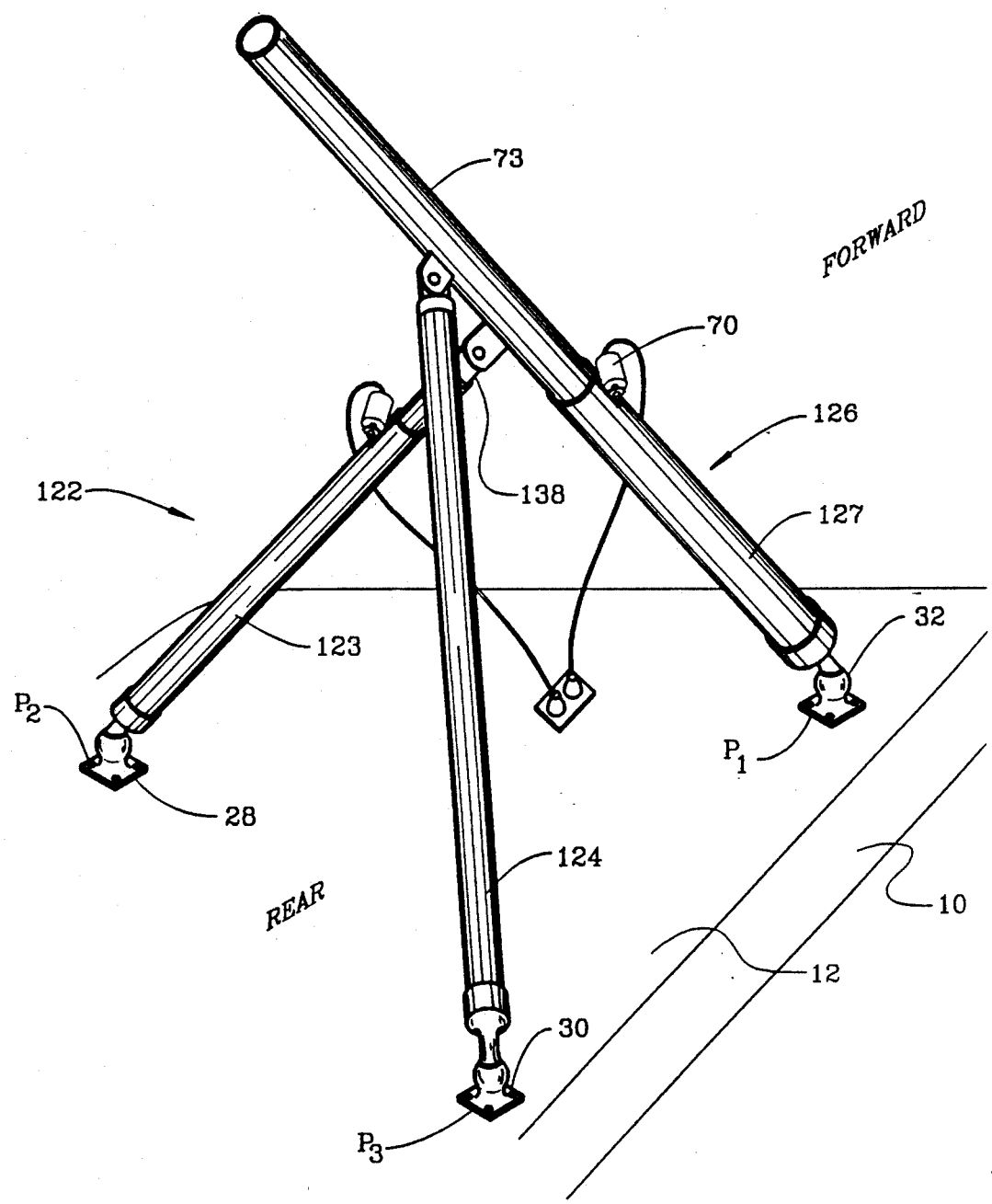
FIG. 6 is a perspective view of the actuator of FIG. 5 connected to the outrigger members.

FIG. 6 shows the rack and pinion embodiment described above connected to the outrigger members.

Figure 7:
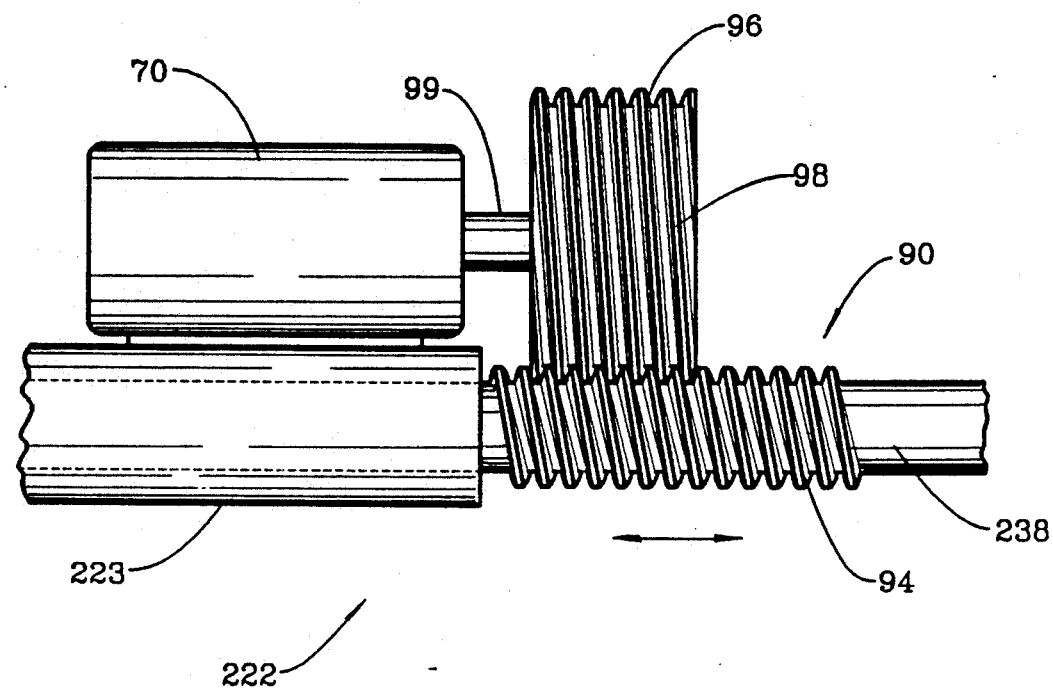
FIG. 7 is a perspective view of a third embodiment of the actuator of the present invention.

A third embodiment of the present invention is shown in FIG. 7. The rack and pinion assembly 69 is replaced by a worm gear assembly 90 cooperating with motor 70. Motor 70 is connected to a power source on the boat 10 (not shown) and is connected to female telescoping member 223. As seen in FIG. 7, variable member 222 is shown as a worm having teeth 94. The length of variable member 222 is longer than shown as indicated by break points in worm 238. Variable member 222 is pivotally attached to boat surface 12 by a universal joint (not shown) as described above. A worm gear 96 having teeth 98 connected by shaft 99 to motor 70. Motor 70 is able to turn worm gear 96 both clockwise and counter-clockwise. Motor 70 is supplied power by a power source (not shown) as described for hydraulic fluid pressure assembly 49. Teeth 94 and teeth 98 cooperate with each other, when motor 70 is energized, to either extend or retract variable member 222. By energizing motor 70, worm gear 96, which is parallel to worm 92, will turn in one direction to translate worm 238 with respect to female telescoping member 223 in turn extend variable member 222 or turn in the opposite direction to translate worm 92 in the opposite direction with respect to female telescoping member 23 to retract variable member 222. It is to be understood that this embodiment will also work in the same manner for variable member 226. Fixed strut member 24 does not change and will function in the same manner as described earlier.

The switch for supplying power to motor 70 for all embodiments incorporating use of a gear assembly, will be located in a similar location to actuators 52 and 54 of the hydraulic embodiment to allow easy accessibility by the driver of the boat. Additionally, all embodiments of the present invention can also be used manually by providing conventional parts (not shown) well known in the art to device 20, such as crank and pulleys. The addition of manual means is beneficial in the rare event of failure of the automatic device.

Figure 8:
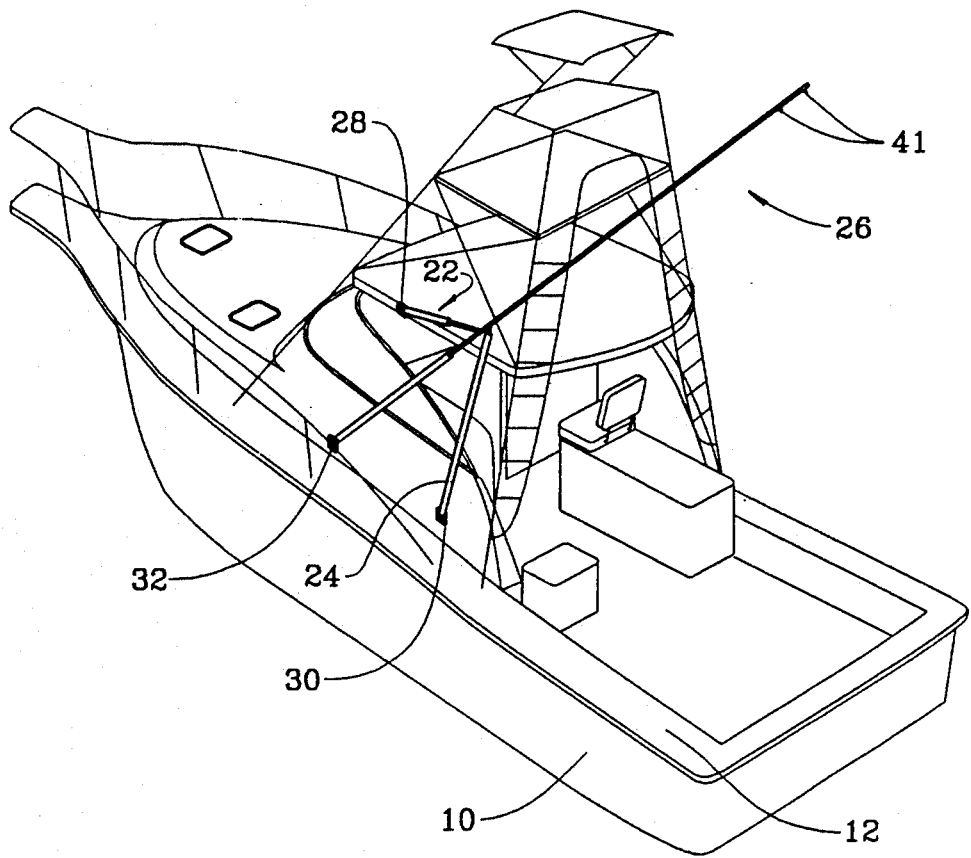
FIG. 8 is a perspective view of one embodiment of the present invention attached to a boat.
Figure 9:
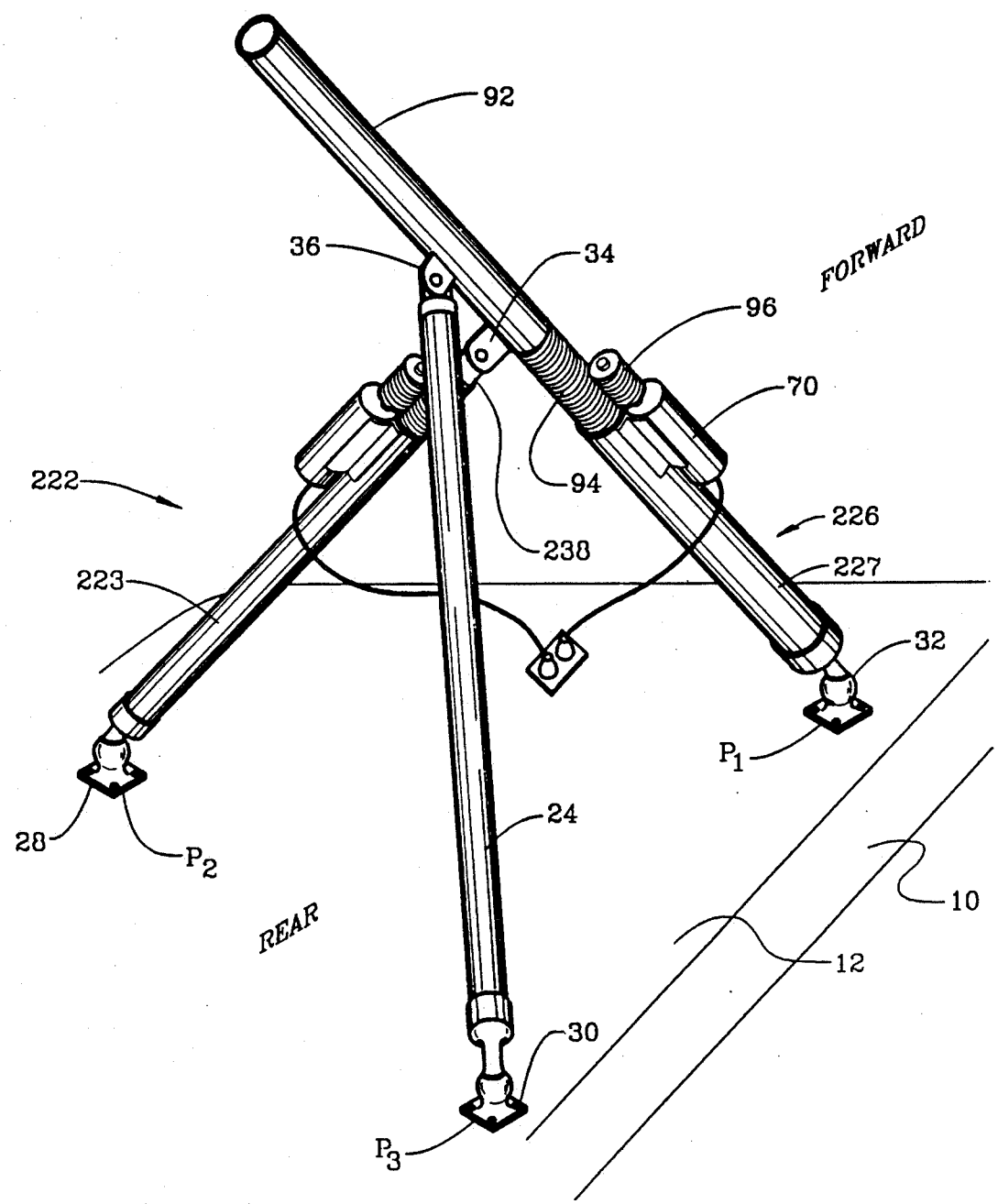
FIG. 9 is a perspective view of a plurality of actuators of FIG. 7 connected to the outrigger members.

One embodiment of the present invention is seen in FIG. 8. Variable members 22 and 24 and fixed member 26 are shown pivotally attached to boat surface 12 of boat 10 by connections 28, 32 and 30 respectively.

While the instant invention has been described in what is considered to be the preferred embodiment, it is to be understood that these descriptions are given by means of example only, and not by means of limitation. It is to be understood that changes and modifications may be made to the description given and still be within the scope of the invention. Further, it is clear that obvious changes and modifications will occur to those skilled in the art.

What is claimed is:

1. An automatic controlled outrigger device for guiding fishing lines on a boat, said outrigger device connected to a boat surface, said boat surface having a forward and rear end, comprising:
   (a) first means for extending and retracting said outrigger device along a first plane, said first means for extending and retracting having a first and second end, said first means for extending and retracting pivotally attached to said boat surface at said first end;
   (b) a rigid support means pivotally attached at a first end to said boat surface and at a second end to said first means for extending and retracting;
   (c) second means for extending and retracting said outrigger device a linear distance along a second plane, said second plane perpendicular to said first plane, said second means for extending and retracting pivotally attached to said first means for extending and retracting at a first end intermediate said first end of said first means for extending and retracting and where said rigid support means for extending and retracting is attached to said first means for extending and retracting, said second means for extending and retracting pivotally attached at a second end to said boat surface, wherein said rigid support means and said second means for extending and retracting are pivotally attached to said boat surface intermediate said boat surface rear end and where said first means for extending and retracting is pivotally attached to said boat surface; and
   (d) means for guiding said fishing lines, said means for guiding said fishing lines disposed near or at said second end of said first means for extending and retracting.

2. The automatically controlled outrigger device of claim 1, wherein said first means for extending and retracting comprises:
   (a) a first gear having teeth, said first gear attached to a shaft;
   (b) means for turning said first gear, said means for turning connected to a power source on said boat, said means for turning attached to said first gear by said shaft; and
   (c) a first elongated rack member having teeth on a portion thereof, said gear teeth and said rack teeth cooperating to extend or retract said elongated member when said means for turning is energized.

3. The automatically controlled outrigger device of claim 1, wherein said second means for extending and retracting comprises:
   (a) a second gear having teeth, said second gear attached to a shaft;
   (b) means for turning said second gear, said means for turning connected to a power source on said boat, said means for turning attached to said second gear by said shaft; and
   (c) a second elongated rack member having teeth on a portion thereof, said gear teeth and said rack teeth cooperating to extend or retract said second elongated member when said means for turning is energized.

4. The automatically controlled outrigger device of claim 1, wherein said first means for extending and retracting comprises:
   (a) a first worm gear having teeth, said first worm gear attached to a shaft;
   (b) means for turning said first worm gear, said means for turning connected to a power source on said boat, said means for turning attached to said first worm gear by said shaft; and
   (c) a first elongated member having teeth on a portion thereof, said worm gear teeth and said elongated member teeth cooperating to extend or retract said elongated member when said means for turning is energized.

5. The automatically controlled outrigger device of claim 1, wherein said second means for extending and retracting comprises:
   (a) a second worm gear having teeth, said second worm gear attached to a shaft;
   (b) means for turning said second worm gear, said means for turning connected to a power source on said boat, said means for turning attached to said second worm gear by said shaft; and
   (c) a second elongated member having teeth on a portion thereof, said worm gear teeth and said second elongated member teeth cooperating to extend or retract said second elongated member when said means for turning is energized.

6. An automatically controlled outrigger device for guiding fishing lines on a boat, said outrigger device connected to a boat surface, said boat surface having a forward and rear end, comprising:

a first automatically adjustable outrigger link means axially adjustable between a first, retracted, position and a second, extended, position;

a second automatically adjustable outrigger link means axially adjustable between a first, retracted, position and a second, extended, position, said second link means connected at a first end to a support surface and at a second end to said first link means; and a third outrigger link means connected at a first end to said support surface and at a second end to said first link means.

7. The automatically controlled outrigger device of claim 6, wherein said first link means is comprised of a first link segment and a second link segment movable with respect to said first link segment; and means for moving said second link segment with respect to said first link segment so as to adjust said first link means between said retracted and extracted positions.

8. The automatically controlled outrigger device of claim 7, wherein said first link means is comprised of a third link segment and a fourth link segment movable with respect to said third link segment; and means for moving said fourth link segment with respect to said third link segment so as to adjust said second link means between said retracted and extended positions.

9. The automatically controlled outrigger device of claim 8, wherein said means for moving said fourth link segment is a hydraulic piston and cylinder arrangement.

10. The automatically controlled outrigger device of claim 8, wherein said means for moving said fourth link segment is a rack and pinion arrangement.

11. The automatically controlled outrigger device of claim 8, wherein said means for moving said fourth link segment is a worm gear arrangement.

12. The automatically controlled outrigger device of claim 7, wherein said means for moving said second link segment is a hydraulic piston and cylinder arrangement.

13. The automatically controlled outrigger device of claim 7, wherein said means for moving said second link segment is a rack and pinion arrangement.

14. The automatically controlled outrigger device of claim 7, wherein said means for moving said second link segment is a worm gear arrangement.

15. The automatically controlled outrigger device of claim 6, wherein said first automatically adjustable outrigger link means includes a first hydraulic piston and cylinder arrangement, and further wherein said second automatically adjustable outrigger link means includes a second hydraulic piston and cylinder arrangement.

* * * * *